(No Model.)
N. O. GOLDSMITH.
APPARATUS FOR PURIFYING WATER.
No. 558,018. Patented Apr. 7, 1896.
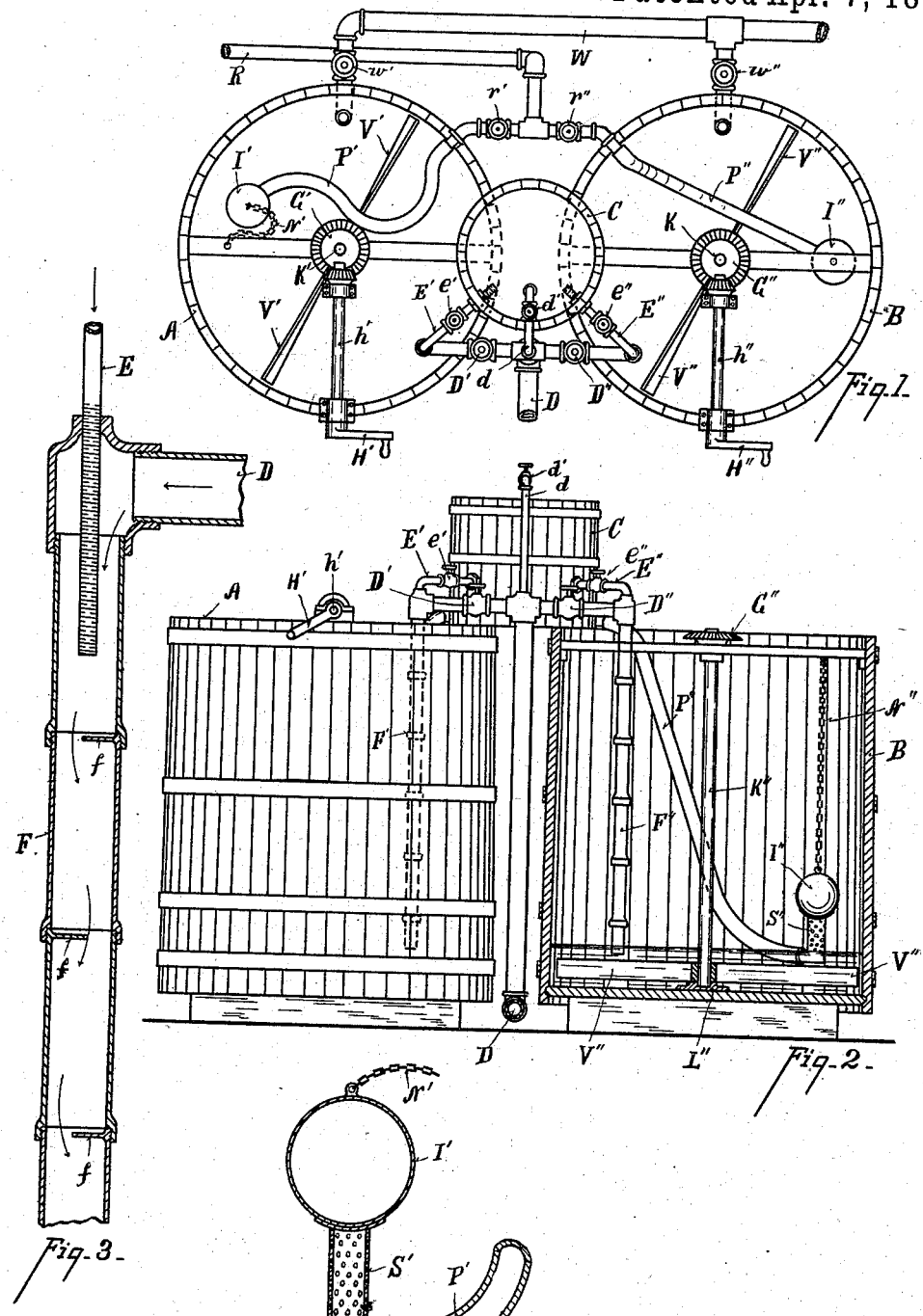
Witnesses
Inventor
Nathaniel O. Goldsmith
by Wood & Boyd
Attorneys

UNITED STATES PATENT OFFICE.

NATHANIEL O. GOLDSMITH, OF CINCINNATI, OHIO, ASSIGNOR TO FRED C. WEIR, OF SAME PLACE.

APPARATUS FOR PURIFYING WATER.

SPECIFICATION forming part of Letters Patent No. 558,018, dated April 7, 1896.

Application filed August 10, 1895. Serial No. 558,933. (No model.)

*To all whom it may concern:*

Be it known that I, NATHANIEL O. GOLDSMITH, residing at Cincinnati, in the county of Hamilton and State of Ohio, have invented certain new and useful Improvements in Apparatus for Purifying Water, of which the following is a specification.

My invention consists in an apparatus to treat impure water containing inorganic impurities in solution by converting the soluble impurities into an insoluble condition by means of suitable chemical reagents.

It comprises improved means for mixing the chemical reagents with the impure water and provides means for settling or precipitating these impurities, which are converted into the insoluble condition by means of the chemical reagents; also an improved means for carrying off the purified water, after it is settled, from the top of the tanks.

My improvement is especially adapted to purifying large bodies of water in settling-tanks by means of chemical reagents, which must be uniformly mixed throughout the entire body of water to be purified by separation. This uniform mixing of the chemical reagents with the large body of water is difficult to accomplish rapidly and efficiently with the means hitherto employed; but my apparatus accomplishes this result efficiently and expeditiously.

The features of my invention will be more fully set forth in the description of the accompanying drawings, making a part of this specification, in which—

Figure 1 is a plan of an apparatus constructed according to my invention. Fig. 2 is an elevation with one of the precipitating-tanks in cross-section. Fig. 3 is a cross-section of the device used for mixing the impure water with the chemical solution. Fig. 4 is a cross-section of the floating take-off pipe and strainer.

Referring to Figs. 1 and 2, A B represent tanks of suitable dimensions and placed upon suitable foundations.

C represents a chemical-tank, elevated above the top of the precipitating-tanks, in which the chemicals are placed and in which the solution of chemical reagent is made.

D represents the inlet-pipe for unpurified water. This pipe rises to the top of the precipitating-tanks A and B and branches to the right and left, having at each end of the branch a downpipe F, Fig. 3, in which the mixture of chemical solution and impure water is made. In the branches of this pipe D are two valves D' D''. A smaller branch pipe $d$ rises to the top of the chemical-tank C, having a valve $d'$ for supplying this tank with water. Just above the bottom of this chemical-tank two pipes E' E'' are taken, and in these pipes are valves $e'$ $e''$. By this arrangement impure water can be admitted through the pipe D and into the precipitating-tank A by opening the valve D' or into the precipitating-tank B by opening the valve D''. The water can be admitted into the chemical-tank C through the pipe $d$ by opening the valve $d'$.

While the water is running into the precipitating-tank A a certain amount of chemical solution is admitted into the pipe E' by opening the valve $e'$. The water then passes along the pipe D, down the pipe F, Fig. 3, while the solution of chemicals comes in the pipe E. The water is dashed against the baffle-plates $f$ in the pipe F, which thoroughly and uniformly mixes the solution of chemicals with the impure water. The precipitating-tanks A are alternately filled with water thus impregnated with the chemical reagents in solution.

At the bottom of the precipitating-tanks A and B are outlet-pipes controlled by the valves $w'$ $w''$. These valves open into a wash-pipe W, through which the settlings from either tank A or tank B may be emptied into the waste by opening the valves $w'$ $w''$, respectively.

Just below the top of the precipitating-tanks A and B pipes are placed having in them valves $r'$ $r''$. These are connected to the single pipe R, through which the purified water can be pumped. These pipes are respectively connected with flexible pipes P' P'', at the other ends of which are placed floats I' I'', to the bottom of which are fastened strainers S' S''. (Shown in section in Fig. 4.) The object of this float I' is to keep the strainer S' always just below the top of the water. The object of the strainer is to prevent the passage into the pipe R of any foreign substance which would not pass through the valves of a steam-pump, such as wood-chips, shavings, or waste.

The flexible pipe connections P' P'' are necessary in order to permit the floats I' I'' to rise and fall with the water. To prevent the floats I' I'' from resting on the bottom of the precipitating-tanks A and B chains are provided. (Shown at N' N''.) These chains are attached to the top of the floats and limit their positions from the top of the tanks.

It is desirable sometimes to supply chemical solutions after the tank has been filled and to mix the same with the water. To accomplish this, I provide a stirring device, which is operated by means of the handles H' H''. These handles turn the shafts $h'$ $h''$ and the gears G' G'', which are keyed to the shafts K' K''. At the bottom of these shafts are fastened two vanes V' V' V'' V''. The bottom of the shaft K'' rests upon a bearing-plate L'', upon which it turns. Thus by revolving the handles H'' the vanes V'' V'' will be revolved and the water thoroughly agitated and stirred up. I do not limit myself to this special device for mechanically stirring the water, inasmuch as any other suitable means of doing this would accomplish the same purpose.

The plan of operation is as follows: We will imagine tank A to be full of water which has been treated with chemicals and settles, and the tank B empty. Under these conditions the water is passing through the strainer S', under the float I', through the pipe P' and the open valve $r'$ into the pipe R, and from thence it passes into the boiler. While they are using water from the precipitating-tank A the empty tank B is filled and the water treated in the following way: Valve D' is closed and valve D'' opened, also valve $e''$. The water is forced up the pipe D, either by city pressure or pump-pressure, through the valve D'' down the pipe F''. The chemical solution from the tank C is admitted through the valve $e''$ and the pipe E'' into the pipe F'', while the impure water and the solution of chemicals are agitated by passing over the baffle-plates $f$, Fig. 3. The water continues flowing in this direction until the tank B is filled. In the meanwhile the float I'', which was near the bottom of the tank B, has risen, carrying with it the strainer S'' and one end of the large flexible pipe P''. After the tank B is filled the water is tested to see if enough of the chemical reagent has been admitted to produce the precipitation. On the contrary, if not enough of the chemical solution was originally admitted, then more is added to bring it to the correct proportion. Any addition of chemical reagents or impure water necessitates a thorough agitation of the water in the tank to make the mixture as nearly uniform as possible. This would be done by means of the mechanical stirring device operated by the handle H. The water is then permitted to settle, and when the tank A is emptied the valve $r'$ is closed and the valve $r''$ opened, when water can be pumped from the tank B, and the tank A can be refilled.

By placing an excess of chemicals in the chemical-tank C a solution can be made rapidly merely by adding water through pipe $d$ and the valve $d'$.

It will be observed that the supply or mixing pipes F' F'' project down and terminate near the bottom. It is the better mode of supplying the water which has been impregnated by the reagents.

It will be observed that the chemical-tanks and their supply-pipes tap the water-supply pipes of the settling-tanks, and that all pipes are closed, so that the water can be forced into the settling-tanks and the pipe E, projecting down into pipe F, so that the force of the water forced through pipe D siphons out the chemical reagent, which is in liquid form. Valves are provided to open and close the supply-pipes, so as to use the tanks A and B alternately.

I claim—

1. In combination with a settling-tank and a chemical-tank, a water-supply pipe having a valved connection with the chemical-tank, a mixing-pipe connecting with the settling-tank and water-supply pipe, and a valved chemical supply-pipe leading from the chemical-tank and extending into the mixing-pipe beyond its connection with the water-supply pipe, substantially as described.

2. In combination with settling-tanks and a valved water-supply pipe common to both tanks, the chemical-tank, the mixing-pipes connecting with the water-supply pipe, and the valved chemical-supply pipes leading from the chemical-tank and extending into the mixing-pipes beyond their connection with the water-supply pipe, substantially as described.

3. In combination with settling-tanks for purifying water, a flexible pipe, a float and strainer attached thereto, and the suspension-chain $N^2$ attached to the float, substantially as specified.

4. In combination with a settling-tank, a chemical-tank, a water-supply pipe, a mixing-pipe, a chemical-supply pipe tapping said mixing-pipe which projects into said mixing-pipe, and a stirring apparatus in said tank and below the mouth of the mixing-pipe, substantially as specified.

In testimony whereof I have hereunto set my hand.

NATHANIEL O. GOLDSMITH.

Witnesses:
W. WOOD,
OLIVER B. KAISER.